United States Patent [19]

Boehm et al.

[11] Patent Number: 5,749,656

[45] Date of Patent: May 12, 1998

[54] THERMAL PROBE ASSEMBLY WITH MOLD-OVER CRIMP SENSOR PACKAGING

[75] Inventors: Michael James Boehm; Peter John Straub, both of Warren; Richard Darrell Kirkwood, Bristolville, all of Ohio

[73] Assignee: General Motors Corporation, Detroit, Mich.

[21] Appl. No.: 914,201

[22] Filed: Aug. 18, 1997

Related U.S. Application Data

[63] Continuation of Ser. No. 514,079, Aug. 11, 1995, abandoned.

[51] Int. Cl.[6] .............................. G01K 7/22; H01R 4/20
[52] U.S. Cl. ............................ 374/185; 439/877; 338/28
[58] Field of Search ................................ 374/185, 208; 439/877, 874, 736; 338/28

[56] References Cited

U.S. PATENT DOCUMENTS

| | | | |
|---|---|---|---|
| 3,900,241 | 8/1975 | Fry | 439/736 |
| 4,239,321 | 12/1980 | Bauer | 439/877 |
| 4,319,800 | 3/1982 | Bernat | 439/736 |
| 4,790,776 | 12/1988 | Iijima | 439/736 |
| 4,815,200 | 3/1989 | Ito | 439/877 |
| 4,841,274 | 6/1989 | Yagner, Jr. et al. | 338/28 |
| 4,842,419 | 6/1989 | Nietert | 374/208 |
| 4,854,894 | 8/1989 | Harrell | 439/736 |
| 5,009,614 | 4/1991 | Fogg et al. | 439/736 |
| 5,025,554 | 6/1991 | Dohi | 439/877 |
| 5,046,857 | 9/1991 | Metzger et al. | 374/185 |
| 5,222,811 | 6/1993 | Miyoshi | 439/874 |
| 5,254,021 | 10/1993 | Yamamoto et al. | 439/877 |

FOREIGN PATENT DOCUMENTS

| | | | |
|---|---|---|---|
| 0131019 | 12/1932 | Germany | 439/874 |
| 3316563 | 12/1984 | Germany | 439/874 |
| 3623927 | 10/1987 | Germany | 439/736 |
| 004239261 | 10/1993 | Germany | 439/874 |
| 403210776 | 9/1991 | Japan | 439/874 |
| 2078020 | 12/1981 | United Kingdom | 439/736 |

*Primary Examiner*—Diego F. F. Gutierrez
*Attorney, Agent, or Firm*—Cary W. Brooks

[57] ABSTRACT

The present invention generally includes a thermal sensor assembly for a vehicle application including an insert molded part having a thermistor/wire sub-assembly and terminal that are assembled with a "F" crimp and resistance welded that are insert molded to a pre-mold or connector that has a shut-off plate seal on the terminal's insulation crimp. The invention provides a more robust package that is resistant to vibration, insulates the terminals from shorting and permits further handling of the sub-assembly without damage to the terminals. Further, the thermistor can be very small and a very small wire can be used to connect the terminal to the thermistor element. Because a smaller thermistor can be utilized, a much smaller probe tip can be design into the thermal sensor assembly. The insert molded part can either be a preform for press-fit applications or a male sensor connector for applications requiring a metal housing. The pre-molded plastic protects the terminals from short circuiting to the sensor shell or other terminal.

3 Claims, 2 Drawing Sheets

THERMAL PROBE ASSEMBLY WITH MOLD-OVER CRIMP SENSOR PACKAGING

This is a continuation of application Ser. No. 08/514.079 filed on 11 Aug. 1995, now abandoned.

FIELD OF THE INVENTION

This invention relates to thermal sensor assemblies for vehicle applications.

BACKGROUND OF THE INVENTION

Temperature sensor assemblies have many different packaging methods and designs for the thermal sensing element. An interference-fit sub-assembly for use with a plastic shell is disclosed in U.S. Pat. No. 5,046,857. However, many of the designs do not adequately insulate terminals and thermistor lead wires. Several are subject to vibration damage.

Another disadvantage of such designs is that some limit the size of the sensor's probe tip and the size of the thermistor package that can be utilized because of the crimpless lead frame terminal used therein. There is a growing demand for products that utilize smaller thermistors and smaller probe sizes. One such small probe tip temperature sensor attaches the thermistor assembly to the male terminals of the sensor connector by either a loop and soldering or resistance welding. The loop and solder method is labor intensifying consisting of looping the thermistor lead through a feature formed into the sensor's terminal and then hand soldering the stripped lead to the terminal. Resistance welding is a process that can be automated and involves the welding of the thermistor lead to the sensor terminal to provide a mechanical and electrical attachment. With both methods of attachment, the thermistor and terminal assembly are then insert molded, molding over the thermistor, with the insert molded comprising the housing or body of the final sensor assembly. However, insert molding over the thermistor poses several problems such as thermistor show-through with plastic sensors, "hoop" stress, slower time response, and the possibility of solder reflow during insert molding process.

Another method of thermal sensor assembly construction involves insert molding over two terminals to make a first sub-assembly and thereafter crimping and resistance welding respective thermistor leads to the sub-assembly terminals. However, the thermistor leads or the sensor's terminal could cause a short circuit condition because they are not electrically isolated from each other and an isolation sleeve must be used to prevent terminals and thermistor leads from contacting a metal sensor shell.

The present invention provides advantages over the prior art.

SUMMARY OF THE INVENTION

The present invention generally includes a thermal sensor assembly for a vehicle application including an insert molded part having a thermistor/wire sub-assembly and terminal that are assembled with a "F" crimp and resistance welded, and are insert molded into a pre-mold or connector that has a shut-off plate seal on the terminal's insulation crimp. As a result, a more robust assembly is produced which is resistant to vibration, avoids shorting of the terminals with each other or a metal housing, and the mold over sub-assembly can be handled without damage to the terminals. Another advantage is that the thermistor can be very small and a small insulated wire can be used to connect the terminal to the thermistor element. Because a smaller thermistor can be utilized, a much smaller probe tip can be designed into the thermal sensor assembly.

The insert molded part can either be a preform for interference-fit applications or a male sensor connector for applications requiring a metal housing. The pre-molded plastic that has been molded over insulation crimp protects the terminals from short circuiting to the sensor shell or other terminal.

These and other objects, features and advantages of the present invention will become apparent from the following brief description of the drawings, detailed description, appended claims and accompanying drawings.

DETAILED DESCRIPTION

Figure 1:
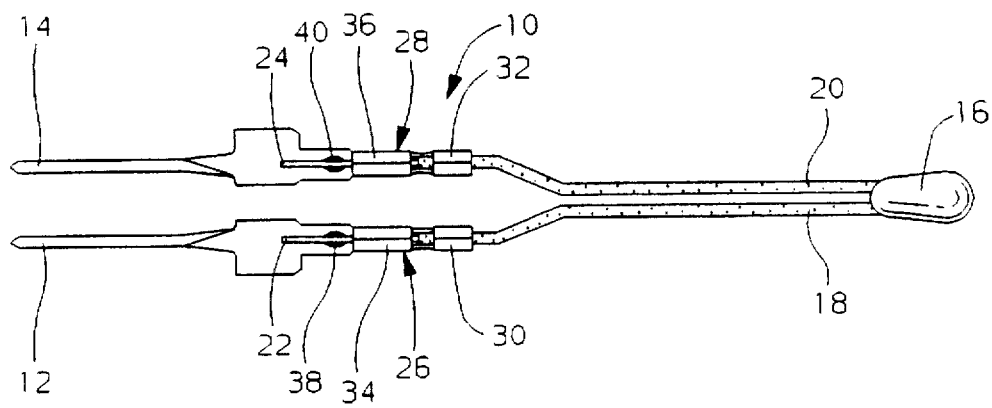
FIG. 1 illustrates a thermal sensor sub-assembly including a terminal and thermistor according to the present invention.
Figure 2:
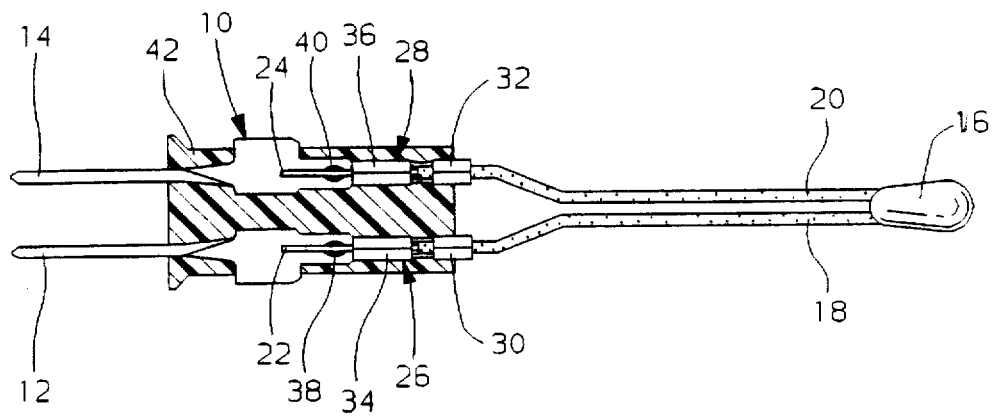
FIG. 2 is an illustration of a sub-assembly according to the present invention wherein a pre-mold for an interference-fit application is molded over a sub-assembly illustrated in FIG. 1.
Figure 3:
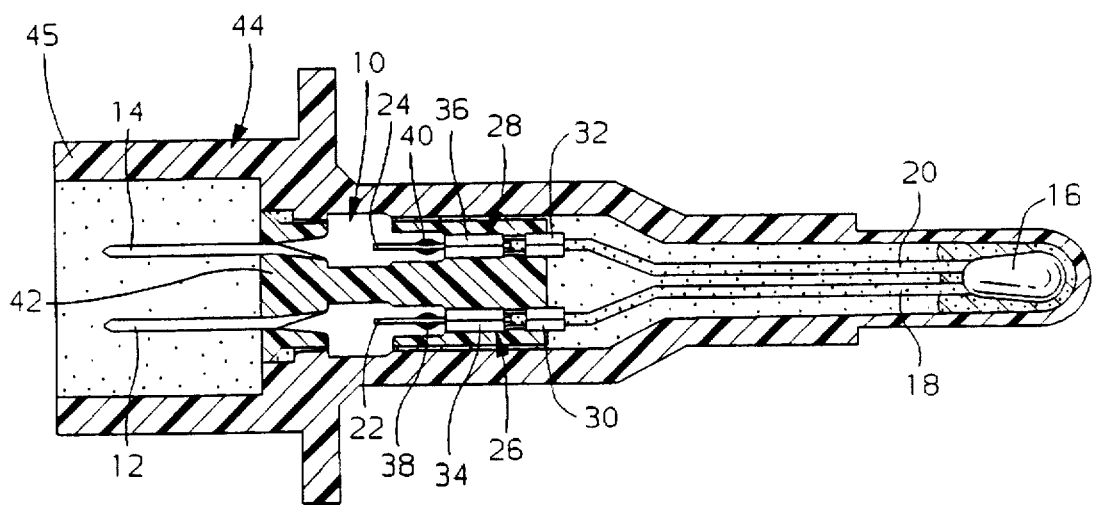
FIG. 3 is a plastic shell thermal sensor assembly according to the present invention.

FIG. 1 illustrates a sub-assembly 10 according to the present invention which includes a pair of male terminals 12, 14, a thermistor 16 including a pair of insulated wires 18, 20 connected thereto. A portion of the wires 22, 24 are exposed near one end. A male terminal 12, 14 is connected to the exposed wire 22, 24 by an "F" crimp 26, 28 which are in communication with the male terminals. The "F" crimp has a first finger 30, 32 crimped to the insulated portion of the wire and a second finger 34, 36 crimped to the exposed portion of the wire. A resistance weld 38, 40 is provided between the second finger and the male terminals. A pre mold 42 (FIG. 2) for an interference-fit application is injection molded so that nearly the entire crimp is encapsulated with plastic. To accomplish this the shut-off plates of the insert molding equipment seal on the terminal's insulation crimp 30, 32, instead of on the terminal before the above-described "F" crimp which would leave the crimp interface exposed. The die shut-off plates are shaped to conform to the cross-sectional profile of the crimp file to provide a good seal. The pre-mold may be assembled to the plastic shell using an interference fit 44 (FIG. 3) which covers the sub-assembly 10, as shown in FIG. 3. The plastic shell provides an open-ended socket 45 around the male terminals 12, 14.

Figure 4:
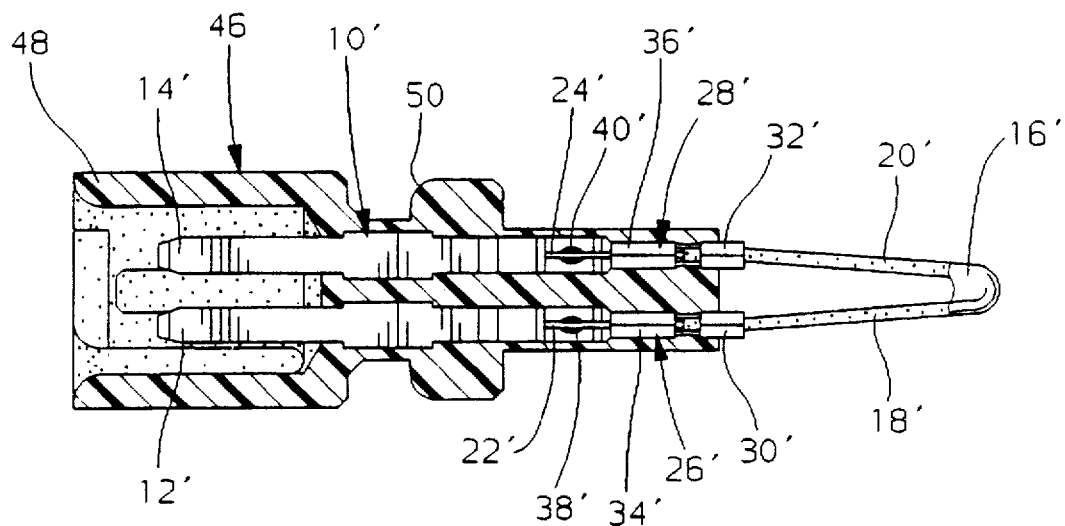
FIG. 4 is a male sensor connector for applications requiring a metal housing which is molded over a sub-assembly similar to that illustrated in the FIG. 1.
Figure 5:
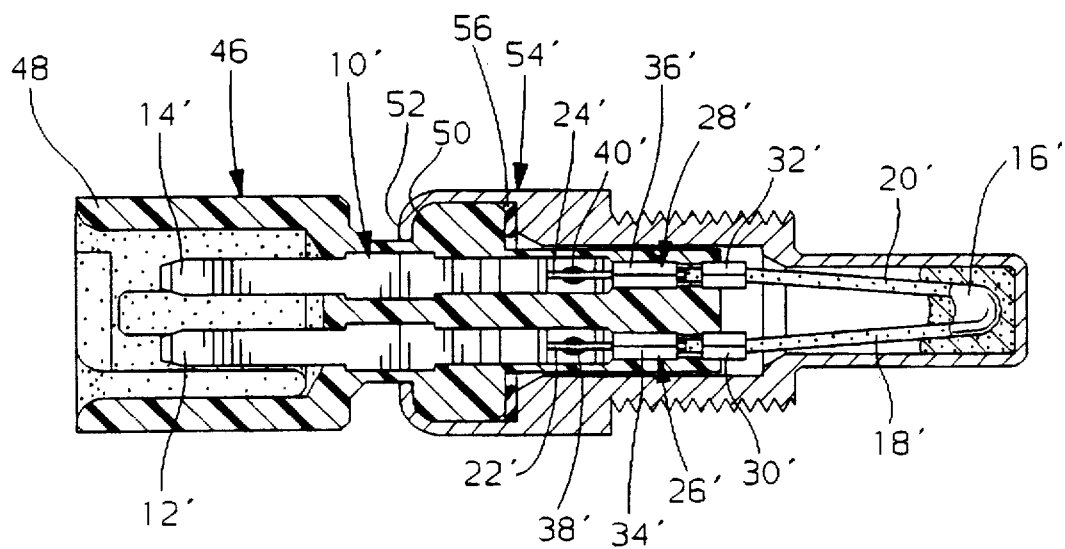
FIG. 5 is a thermal sensor assembly which includes a metal housing crimped over the male sensor connector of FIG. 4.

Alternatively, a male connector 46 (FIG. 4) may be molded around a sub-assembly similar (similar components given corresponding prime numbers) to that of FIG. 1 so that the crimp is completely encapsulated with plastic. The male connector 46 provides an open-ended socket 48 around the male terminals 12', 14'. Preferably the male sensor connector includes a shoulder 50 onto which a finger 52 of a metal housing 54' is crimped (FIG. 5). A seal 56 may be interposed between a shoulder formed in the metal housing and an end of the male connector to prevent water from entering the sensor.

The present invention provides a more robust design in that the pre-mold plastic protects the crimp and the resistance welded thermistor terminal assembly during assembly of the sensor and provides for improved resistance to vibration. The use of an insert molded plastic eliminates the need to isolate the terminals and thermistor leads from each other and from the metal shell. The design allows for flexibility with thermistor resistance calibration and lead length and thus allows the same insert mold tool to be used for several different sensor packages by interchanging the thermistor.

Finally, a smaller thermistor can be used because smaller wires such as 0.8 mm$^2$ (28 Awg) can be used to connect the terminal to the thermistor element. The smaller wire is used to allow proper attachment of the thermistor. Because a smaller thermistor can be utilized a much smaller probe tip can be designed into the thermal assembly. As a result, faster response times are achieved due to the smaller probe tip size. The smaller sensor tip and thermistor have less mass that must change temperature for the sensor to respond.

The pre-mold insert or male connector may be formed by method known to those skilled in the art, for example, by injection molding a plastic such as polybutylene terephthalate polyester (PBT), polyethylene terephthalate polyester (PET), polyamide (PA) or polyetheramide (PEI), within the appropriate operating conditions for molding pressure, temperatures, and cycle times.

What is claimed is:

1. A thermal sensor comprising:

a thermistor and a pair of wires leading therefrom, each wire having an insulation covering a portion thereof so that one end of the wire is exposed, a male terminal for each wire, the male terminal having a metal crimp having a first finger crimped to the insulation covering the wire and a second finger crimped to the exposed end of the wire, and wherein the exposed end of the wire is resistance welded to the crimp;

a pre-mold sealing off on the first finger and encapsulating the second finger, the resistance weld, and only a portion of the first finger leaving a portion exposed.

2. A thermal sensor as set forth in claim 1 further comprising a metal housing secured to the pre-mold and surrounding the thermistor, and wherein the pre-mold further encapsulates a portion of each wire and a portion of each terminal so as to isolate the respective portions of each wire and terminal from each other and from the metal housing.

3. A thermal sensor as set forth in claim 1 further comprising a plastic housing secured to the pre-mold and surrounding the thermistor.

* * * * *